United States Patent [19]
Fergason

[11] Patent Number: 5,629,806
[45] Date of Patent: May 13, 1997

[54] RETRO-REFLECTOR BASED PRIVATE VIEWING SYSTEM

[76] Inventor: James L. Fergason, 92 Adam Way, Atherton, Calif. 94025

[21] Appl. No.: 345,657

[22] Filed: Nov. 28, 1994

[51] Int. Cl.[6] .................................................. G02B 27/14
[52] U.S. Cl. ........................... 359/630; 359/631; 359/633
[58] Field of Search ................................. 359/630, 629, 359/631, 632, 633, 634, 636; 353/99

[56] References Cited

U.S. PATENT DOCUMENTS

| | | | |
|---|---|---|---|
| 2,883,908 | 4/1959 | Copeland . | |
| 3,200,702 | 8/1965 | Giordano | 352/61 |
| 3,447,854 | 6/1969 | Minter . | |
| 3,567,981 | 3/1971 | Benton | 95/18 |
| 3,609,007 | 9/1971 | Peek | 350/150 |
| 3,620,592 | 11/1971 | Freeman . | |
| 3,767,291 | 10/1973 | Johnson | 350/237 |
| 3,767,305 | 10/1973 | Craven | 356/71 |
| 3,832,038 | 8/1974 | Johnson | 350/236 |
| 4,200,366 | 4/1980 | Freeman | 353/78 |
| 4,348,185 | 9/1982 | Breglia | 434/43 |
| 4,509,837 | 4/1985 | Kassies | 353/10 |
| 4,561,722 | 12/1985 | Smetana . | |
| 4,609,253 | 9/1986 | Perisic . | |
| 4,840,455 | 6/1989 | Kempf . | |
| 5,016,096 | 5/1991 | Kowalski | 356/371 |
| 5,189,452 | 2/1993 | Hodson | 353/94 |
| 5,337,096 | 8/1994 | Qu | 353/7 |
| 5,418,584 | 5/1995 | Larson | 353/122 |

*Primary Examiner*—Georgia Y. Epps
*Assistant Examiner*—Ricky Mack
*Attorney, Agent, or Firm*—Renner, Otto, Boisselle & Sklar, P.L.L.

[57] ABSTRACT

A display system and method for displaying an image including focusing optics to focus light from an image source, retro-reflector and beamsplitter, the image source and beamsplitter directing light toward the retro-reflector being directed via the beamsplitter for viewing and folding an optical path in the conjugate optics.

34 Claims, 9 Drawing Sheets

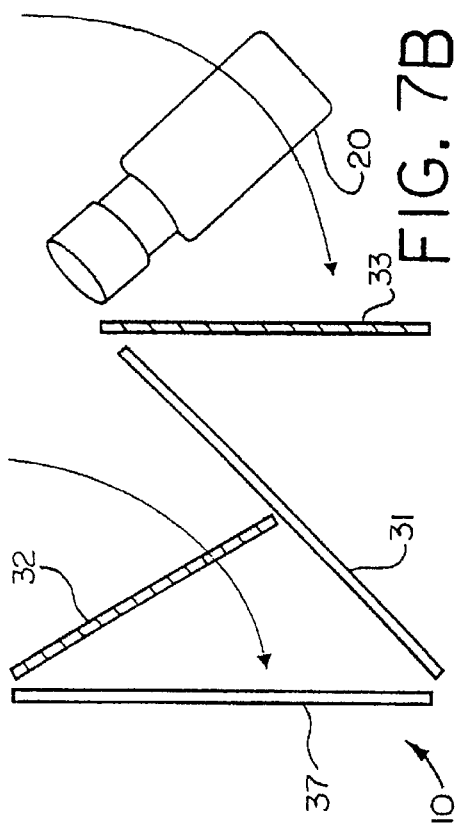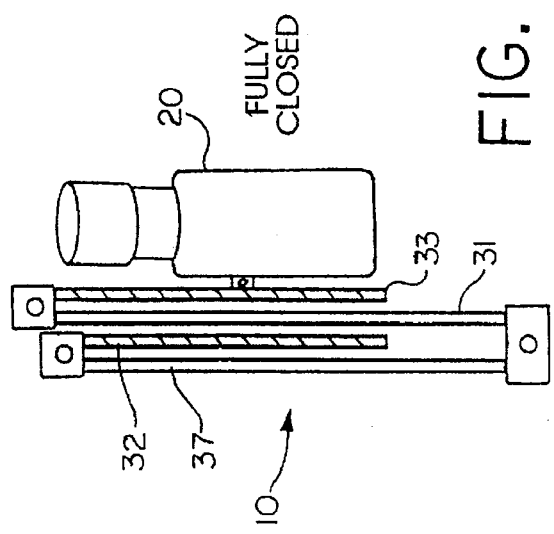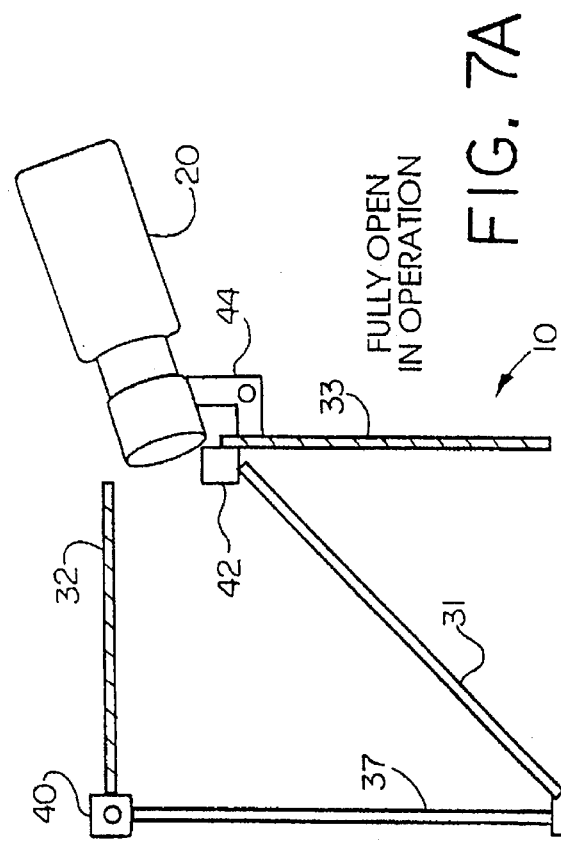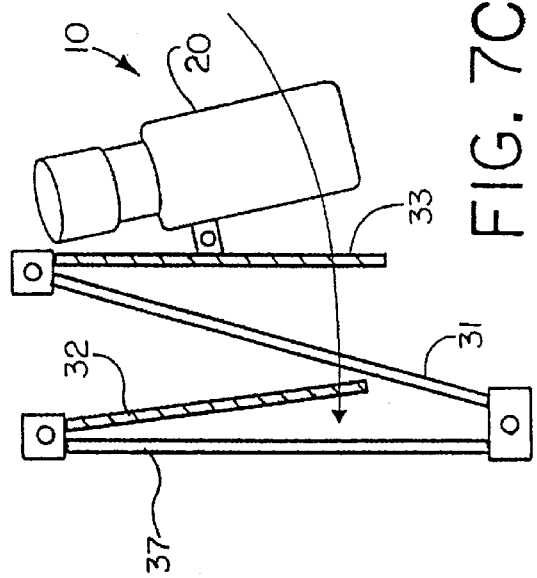

RETRO-REFLECTOR BASED PRIVATE VIEWING SYSTEM

TECHNICAL FIELD

The present invention relates generally, as is indicated, to viewing systems, more particularly, to viewing systems which use a retro-reflector and provide viewing privacy, and to methods for presenting for viewing a relatively large image that is derived from a relatively small image source. The invention also relates to the provision of privacy in viewing an image from a display, and to methods of displaying images.

CROSS REFERENCE TO RELATED PATENT APPLICATION

Reference is made to applicant's copending U.S. patent application Ser. No. 08/295,383, filed Aug. 24, 1994, and to concurrently filed, commonly owned U.S. patent application Ser. No. 08/345,656, now U.S. Pat. 5,572,363 for "A Retro-Reflector Based In-Line Viewing System", the entire disclosures of which hereby are incorporated by reference.

BACKGROUND

Conventional computer displays, such as cathode my tube (CRT) displays, liquid crystal displays, electroluminescent displays, and the like present a light output representing characteristics of an image. The image may be a graphical or pictorial one, an artistic one without any particular form, an alphanumeric one (including various alphabets and/or number systems), etc. Usually the image is presented on a screen which may be flat or somewhat curved, it being appreciated that substantial effort currently is being expended in providing developments for improvements in flat displays, such as those known as flat panel displays.

Usually such conventional displays must be sufficiently large to permit the displayed image, whether graphical, alphanumeric, or other, to be viewed comfortably by a person. Exemplary displays used on portable computers usually have a diagonal dimension exceeding nine inches. Some personal organizer type computers, such as those known as a personal digital assistant, have smaller displays, but in any event the display must be sufficiently large to be read by a person. Usually the larger the display, the greater the cost. Also, the larger the display, the greater the weight.

Displays also are used in automatic bank teller machines and the like, public telephones, and for televisions in public places, such as on an airplane. It would be desirable to provide privacy for such displays and possibly also for other displays.

For example, imagine an automated teller machine of the kind found at a bank. While using the machine, personal/confidential information may appear on the display. It is highly desirable that this information not be visible to other people in the area. Consider a public telephone of the type that contains a display. There may be occasions when the user would prefer that the information on the display not be visible to others.

Some airplanes have a flat panel display located at each seat. Passengers that pay a fee can see a video. The airlines may find it desirable that those who do not pay be unable to see the display. From another standpoint, it is desirable that people who do not choose to see the video not be annoyed by their neighbors who have chosen to watch the video.

Over the years substantial effort has been applied to expand the viewing angle for many displays. For example, off-axis viewing can be enhanced in a liquid crystal display by using optical retarders, as is disclosed in U.S. Pat. No. 4,385,806. However, a disadvantage when a display has a wide field of view is the lack of privacy; for example, as an individual is working on a portable computer while riding on a public vehicle, another rider may too easily observe the display. Another disadvantage is the wide distribution of light output that may occur when there is a wide angle of view provided by a display; such wide distribution may reduce the brightness, intensity and/or contrast of the display.

An effort is made herein to distinguish between field of view and angle of view (also referred to sometimes as viewing angle). A field of vie usually refers to how wide an image looks or appears to the eye or how much of a display is able to be seen at one time. The angle of view is usually refers to the angle at which one looks at or can look at an image, display, etc. For example, a narrow angle of view at which a monitor (or some other display device) must be viewed means that although the full monitor can be viewed, such viewing can be had from only a relatively small spot, or even from one spot or position. However, that monitor may present a relatively wide field of view to the viewer. As another example, in a heads up speedometer display of an automobile, the angle of view usually is relatively narrow so only the driver sees the display,; but the field of view usually is sufficiently wide to permit all of the desired information to be seen by the driver.

One prior approach to provide privacy in viewing a display has been to use a head mounted display which is supported on the head of a user (or on some other body part, for example), a helmet mounted display, etc. and provides a closed area in which the eye(s) view(s) the images provided by the display. Such displays sometimes provide increased immersion into the image whereby the user can observe the displayed images without being distracted by other visual stimuli, etc. Another technique for increasing the private viewing of a display has been to use a binocular, telescope or microscope type system through which the observer looks to see an image.

It is desirable that a display have adequate comfort with which images can be viewed and adequate eye relief. One aspect of comfort is the distance at which the image is viewed or appears to be located relative to the viewer's eye(s); a comfortable viewing distance is about 20 inches or more, for example, approximate reading distance. This distance physically can be changed using lenses, e.g., eyeglasses, but the apparent distance of the image should be maintained at a comfortable distance of, for example, 20 inches or more. An aspect of eye relief is the distance between the eye and the last optical element closest to the eye, such as the output objective of a microscope, telescope, etc. Often, it is desirable that such distance be relatively large to provide adequate eye relief. Without adequate eye relief and/or comfortable viewing distance, a person's eye(s) may be strained to view an image and/or otherwise caused discomfort.

In a helmet mounted display (sometimes referred to as a head mounted display), lenses may be placed at the eyes of the viewer (person) to reduce the physical size of the display system. The viewing angle and the field of view usually are relatively wide, which helps to accomplish immersion in the image. Eye relief may be relatively small because the user's (viewer's) face usually is mounted next to the viewing system. The head box is relatively small; this is acceptable because the head position is known and fixed with respect to the "sweet spot". The head box is the volume in which the viewer's head or face may be placed to see an image produced by a display. Often the head box is bounded by width, depth and height dimensions. Usually, anywhere a viewer puts the head relative to or in a head box, the intended image can be seen. In a head mounted or helmet mounted display the head box usually is limited to the area of the display and the head is located in a relatively fixed position to the optical components, and the head box is relatively small; in the present invention as is described below, preferably the head box is a location or position remote from the optical components of the viewing system and may be relatively large. The sweet spot is the position, location or point in space, generally over an extended area, at which the eyes must be positioned relative to the optical components of the display or viewing system so as to see (view) the image as well as possible. Sometimes the image may be seen when the eyes are at other than the sweet spot, e.g., near the sweet spot but not precisely there, but usually the best appearance of the image is when viewed from the sweet spot.

In contrast to a helmet mounted display, in a private viewing system it would be desirable to have the following characteristics. Lenses would not be needed to view the image because the image can be viewed relatively from afar. A narrow viewing angle would be acceptable to enhance privacy. Eye relief would be relatively large, for example, being as much as several feet, such as when the display being viewed is one for showing a video on an airplane, a bank teller machine, a telephone, etc. Additionally, the head box would be relatively large with a relatively large sweet spot that allows the display to be seen with one or possibly with both eyes and affords the possibility of back-and-forth (in-and-out), up-and-down, and side-to-side head movement relative to the display image source and sweet spot, for example.

A problem with many prior display systems is the relatively large amount of power required to operate the display. For example, a power hungry display is especially disadvantageous in a battery powered computer, in a video display used in a vehicle, such as an automobile, aircraft, watercraft, etc., where there may be a limited supply of power. It also would be desirable to reduce the power required for a display and/or the power requirements of a device, such as a computer, video display system, etc., which uses a display.

Removal or reduction of glare in or on a display is another problem for which substantial effort has been expended in the past. Glare usually is due to the reflection of ambient light from a display screen, monitor, liquid crystal display, cathode ray tube, electroluminescent display, etc. Most efforts in the past to try to reduce glare also have reduced the brightness of the image presented by the display. It would be desirable to reduce glare while minimizing the impact on the brightness of the image presented by a display.

With the foregoing in mind, then, there is a need to provide private viewing of an image from a source.

BRIEF SUMMARY OF THE INVENTION

According to one aspect of the invention, a viewing system includes a focusing means, and conjugate optics, including a retro-reflector and a beamsplitter, and folding means for folding the optical path in the conjugate optics, and the focusing means being operable to direct an image from a source for focusing in the conjugate optics, and the conjugate optics including an output for viewing of the image.

According to another aspect, a viewing system includes projector means for projecting along an optical path an image from an image source, beamsplitter means for reflecting at least some of the light incident thereon and for transmitting at least some light incident thereon, retro-reflector means for receiving at least some light from the beamsplitter means and for reflecting such light in a conjugate path back toward the beamsplitter means, a reflector for folding at least part of the optical path between the beamsplitter means and retro-reflector means, and wherein at least some of the light reflected by the retro-reflector means is provided by the beamsplitter for viewing of an image at a viewing location.

According to a further aspect, a display system includes an image source, a retro-reflector, optical means for directing light from the image source to the retro-reflector, and means for folding at least part of the optical path between the retro-reflector and the optical means, the optical means also directing light reflected by the retro-reflector for viewing.

According to an additional aspect, a display system includes a retro-reflector, means for focusing an image relative to the retro-reflector, beamsplitter means for reflecting and transmitting light relative to the retro-reflector, whereby the beamsplitter means one of transmits light and reflects light toward the retro-reflector for focusing relative to the retro-reflector and the other of transmits light and reflects light from the retro-reflector for viewing, and means for folding at least part of the optical path between the retro-reflector and the beamsplitter means.

According to yet another aspect, a viewing system includes a retro-reflector, means for directing incident light having characteristics of an image toward the retro-reflector, means for permitting viewing of reflected light reflected by the retro-reflector, the means for permitting viewing comprising light splitter (sometimes referred to as a beamsplitter) means for reflecting at least some of one of the incident light and reflected light and for transmitting the other of the incident and reflected light, and means for folding at least part of the optical path between the retro-reflector and the light splitter means.

According to yet a further aspect, a method of displaying an image with relative privacy includes projecting an image toward a retro-reflector to provide incident light on the retro-reflector to form an image relative to the retro-reflector, reflecting light by the retro-reflector along a conjugate optical path, relative to the incident light on the retro-reflector, toward a viewing location at which the image may be viewed, the projecting including at least one of reflecting or transmitting light by a beamsplitter to provide incident light to the retro-reflector, and the reflecting light toward a viewing location including the other of transmitting or reflecting, by the beamsplitter, light which has been reflected by the retro-reflector, and further comprising folding the optical path traveled by light projected toward the beamsplitter.

According to yet an additional aspect, a method of displaying an image for relatively private viewing includes projecting light from a source toward a retro-reflector via a beamsplitter, folding the optical path between the image source and the beamsplitter to increase the optical path of light travelling from the source to the retro-reflector, and reflecting incident light on the retro-reflector as reflected light from the retro-reflector via the beamsplitter to a viewing location for viewing.

According to even another aspect, a method for storing a retro-reflector based viewing system, including a retro-reflector and a beamsplitter includes placing the retro-reflector and beamsplitter is generally flat relatively overlying relation.

According to even a further aspect, a foldable viewing system includes a retro-reflector, projector means for directing incident light having characteristics of an image toward the retro-reflector, beamsplitter means for permitting viewing of reflected light reflected by the retro-reflector, the beamsplitter means being positioned relative to the projector means and the retro-reflector for reflecting at least some of one of the incident light and reflected light and for transmitting the other of the incident and reflected light, and reflector means for folding at least part of the optical path between the retro-reflector and the beamsplitter means, and foldable support means for supporting the retro-reflector, beamsplitter means and reflector means relative to each other to provide an image for viewing at a viewing area in response to incident light being received from the projector means.

Several other features and advantages of the present invention are summarized here. These features and advantages may be used alone and/or in combination with other features, aspects and/or advantages described herein. For example, the invention may be used to provide an enlarged and relatively private view over a relatively narrow angle of view of a relatively small display, image source, etc., while providing a relatively wide field of view. Light may be collected so that a relatively large amount is directed to the retina of a viewing eye while reducing the amount of light which is otherwise lost to the system, thus enabling the display to be relatively bright without requiring an especially bright source of light for the display, image source, etc. Also, since the viewing system may be used to enlarge the image provided by the source, a relatively small source can be used to supply the image for viewing. The smaller source can reduce power requirements, weight, etc., as is known. The light may be spread over the retina of the viewing eye and, therefore, the space between pixels (picture elements) of the image source, such as a liquid crystal display, for example, tends to be somewhat dampened thereby to reduce the distinction seen between pixels and optically inactive space in the display. Further, using the glare reducing technique hereof, glare can be reduced without significantly reducing brightness of the viewed output.

One or more of these and other aspects, objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 7A–7D are schematic illustrations of a viewing system of the present invention depicting the compact folding of the system for storage;

DESCRIPTION

Figure 1:
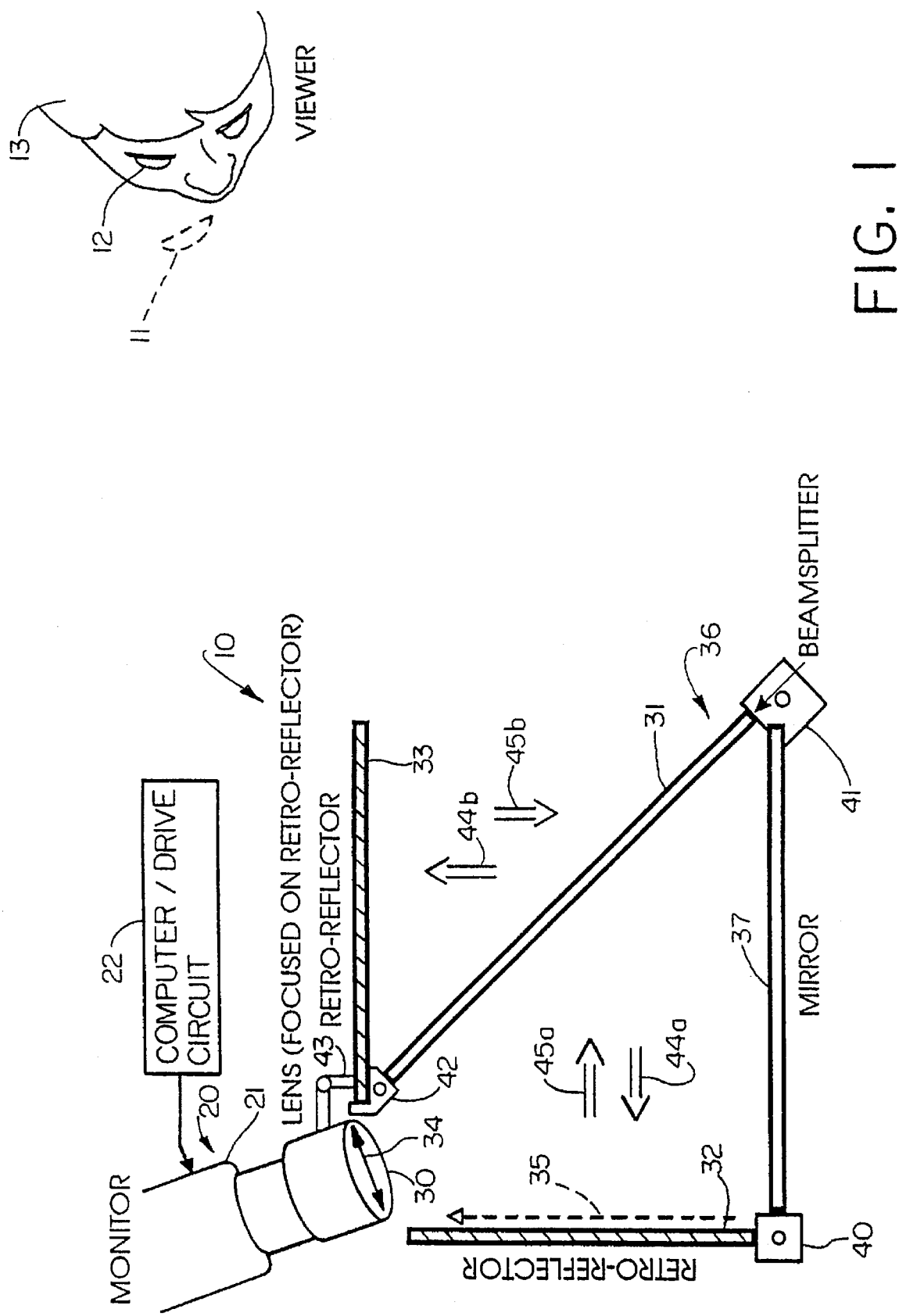
FIG. 1 is a schematic illustration of a viewing system in according with the present invention.

Referring to the drawings in which like reference numerals designate like parts in the several figures, and initially the FIG. 1, a viewing system in accordance with the present invention is shown at 10. In a sense, the viewing system 10 may be considered an eye piece for viewing an image produced by a source. The source may be a display which creates an image for viewing, either by controlling transmission or reflection of light, by providing a light output or by modulating light, may be a view of a real life scene, etc.

The viewing system presents at a viewing location 11 an image for viewing by an eye 12 of a viewer 13, such as a person, other animate or inanimate object, machine, etc. The image presented at the viewing location 11 may be of a size such that it is seen ordinarily by a single eye 12 or it may be of a size as to be seen simultaneously by both eyes of the viewer, as is described further below.

An image source 20 provides an image input to the viewing system 10. The image source (sometimes simply referred to as source) may include, for example, a liquid crystal display (LCD), cathode ray tube display (CRT), electroluminescent display, computer monitor, television, etc., which is generally indicated at 21. The display 21 may be a miniature image source, such as one conventionally available as a twisted nematic liquid crystal display. One example is that sold by SONY Corporation under the designation XCM07, which has a diagonal dimension of approximately 0.7 inch. Also, it will be appreciated that the invention is useful with virtually any type of image source or display source. An example of such a display source is a compact flat panel display, and especially one utilizing a reflective liquid crystal display made from a single crystal silicon active matrix array. An example of such image source is disclosed in copending, commonly owned U.S. patent application Ser. No. 08/275,907, filed Jul. 5, 1994, the entire disclosure of which hereby is incorporated by reference.

The image source 20 also may include a computer or other drive circuitry, such as that circuitry used conventionally in a television, in a computer video card, etc., generally designated 22, for developing electrical signals to operate the display device 21.

An exemplary display 21 may be one proposed by SONY Corporation in a paper presented at the Society for Information Display, International Display Research Conference, Oct. 10–13, 1994, Monterrey, Calif., entitled "A 1.35-in-diagonal Wide-Aspect-Ratio Poly-Si TFT LCD with 513 K pixels", at pages 414–417 of the conference record. Other types of liquid crystal displays or other display devices may be used in and/or with the invention.

The viewing system 10 includes tales focusing optics 30, beamsplitter 31, and one or more retro-reflectors, two being shown, respectively, at 32, 33. The focusing optics 30 may be a single lens or a combination of lenses, which projects an image from the display 21 toward the retro-reflector(s) via the beamsplitter. Alternatively, the focusing optics 30 may be some other device that is able to focus light in the manner described herein. In particular, desirably the focusing optics 30, which will be referred to hereinafter as a lens, is intended to receive from the image source 20 light representing or having characteristics of an image, such as pictorial, graphical and/or alphanumeric information or images, and to project light toward the beamsplitter while expanding or enlarging the light or image to present an enlarged image. Thus, in a sense, the display or monitor 21 in combination with the lens 30 may be considered a projector for projecting or directing an image via the various components for viewing at the viewing location 11. As is seen in FIG. 1, the image 34 directly at the output of the lens 30 is a vertically pointing arrow, and the enlarged image of the vertically pointing arrow is shown at 35. The focusing optics may include other components, such as lenses, reflectors, prisms, filters, polarizers, wave plates, apertures, stops, etc.

The beamsplitter 31 may be, for example, a sheet of glass or some other material that is able to reflect some of the light which is incident thereon and is able to transmit some of the light that is incident thereon. The ratio of the amount of light reflected and transmitted may vary. For example, that ratio may be approximately 50 percent, i.e., evenly divided so that about half the light incident on the beamsplitter is reflected by it, and half is transmitted by it. The beamsplitter 31 may be flat, planar, and arranged in such a way that the plane thereof is parallel with the major planar extent of the lens 30. However, if desired, the beamsplitter may be oriented in a different relation to the lens 30.

The retro-reflectors 32, 33 may be, for example, a screen or sheet of retro-reflecting material. A retro-reflector is a device which reflects light substantially in the same, but opposite, direction as the direction that the light is incident on the retro-reflector. One example of retro-reflector is a corner reflector or a sheet having a plurality of corner reflectors. Another example of retro-reflector is a material having plural glass beads or other refracting and/or reflecting devices on or in a support. The resolution of a retro-reflector may be a function of, for example, the number of corner reflectors per unit area, the number and/or size of beads per unit area, etc. Usually the better or greater the resolution or quality of a retro-reflector usually the larger the number of corner reflectors, for example, per unit area.

Various retro-reflectors are well known in the art. An example of a retro-reflector is a film or sheet material having a plurality of corner cubes which material is sold by Reflexite Corporation of New Britain, Conn. Such material is available having about 47,000 corner reflectors per square inch. Usually, the larger the number of corner reflectors per unit area, the better will be the resolution and overall optical output quality provided by the viewing system 10. However, retro-reflector material having better or worse resolution than that provided by the mentioned retro-reflector material may be used in accordance with the principles of the present invention.

The beam splitter 31 and retro-reflectors 32, 33 cooperate to form, at least in part, a conjugate optical system or conjugate optics path 36 in which light travels at some locations along conjugate optical paths.

Such conjugate optical paths travel means that the particular light ray, beam, etc., travelling to a retro-reflector, for example, is incident on the retro-reflector and is reflected as reflected light from the retro-reflector back along exactly the same path or substantially the same path of the incident light, except the direction of the reflected light is opposite the direction of the incident light.

The viewing system 10 may provide an image for viewing at a viewing location 11 which is located several feet, for example, from the respective retro-reflectors, 32, 33. To achieve such relatively long optical path distance between the viewing location and the retro-reflectors, the projector, e.g., the lens 30, should be placed at a similar distance, e.g., several feet, relative to the retro-reflectors. To minimize the size of the optical system 10 while still accomplishing the aforesaid relationship, means may be provided to fold the optical path of light travelling in the optical system 10, particularly, the optical path from the projector lens 30 to the retro-reflectors 32, 33. As is illustrated in FIG. 1, a mirror 37 may be used to fold the optical path in the viewing system 10. The illustrated mirror in FIG. 1 is a planar reflective mirror, such as a sheet of glass having a silver coating on one surface. Other types of mirrors, or reflectors, may be used, one example being prisms or the like. Moreover, a single mirror is shown; however, it will be appreciated that multiple reflectors may be used to provide the desired folding of the optical path and increasing of the path length between the projection lens 30 and the retro-reflectors 32, 33 so that such length is approximately the same (preferably is identical) as the distance between the retro-reflectors and the viewing location 11.

In the embodiment illustrated in FIG. 1, the various parts of the viewing system 10 are assembled in relation to each other using various inter-connections, supports, and hinges, which are designated, respectively, 40–44. The members 40–44 are useful to hold the various parts of the viewing system 10 in relation to each other in the manner generally shown in FIG. 1, for example. The components 40–44 permit folding of the viewing system for storage, for example, in a manner described in greater detail below. Also, as will be appreciated from the description below, the viewing system 10 is relatively robust and is relatively insensitive to a requirement for close or accurate positioning of the various components forming the conjugate optics 36 (e.g., beam splitter 31, retro-reflectors 32, 33, and mirror 37) relative to each other. Likewise, precise positioning of the image source 20 relative to the conjugate optics 36 ordinarily is unnecessary; and, in fact, the ability to provide some movement of the image source relative to the other portions of the viewing system 10 facilitates altering the position of the viewing location 11 for the comfort, for example, of the viewer 13.

However, for optimal operation it may be desired to position the retro-reflectors 32, 33 the same distance from the lens 30 and to focus the image, e.g., a real image, at the retro-reflectors.

It will be appreciated that the lens 30, beamsplitter 31 and retro-reflectors 32, 33 cooperate to allow the enlarged image 35 to be viewed at the viewing location 11. Also, it will be appreciated that the, viewing location 11 in essence is arranged so as to be the opposite counterpart to the lens 30 in that the viewing system 10 causes the viewing location 11 to be functionally and optically at a location in relation to the image produced by the image source 20, essentially the same as the relation of the lens 30 to the image display 21 or provided by the image source 20. However, at the viewing location 11 the eye 12 is able to see the enlarged image 35. Therefore, although the image source 20 may be a relatively small image source, such as one of those mentioned above, the actual size of the enlarged image 35 seen by the eye 12 at the viewing location 11 is significantly larger, for example, on the order of several inches diagonal dimension, and is able to be easily read, viewed, etc. In an embodiment of the invention using a 0.7 inch diagonal SONY liquid crystal display mentioned above and a lens 30 with a focal length of 50 mm (millimeters), the displayed image at the viewing location 11 (or sweet spot) had a diagonal dimension of about 9 inches and provided more than twenty inches distance between the sweet spot and the image location.

As is characteristic of a retro-reflector, the light incident on the retro-reflectors 32, 33 is reflected by the retro-reflectors such that the path of respective incident and reflected light rays is conjugate, i.e., the same, but in opposite directions. Therefore, light reflected by the retro-reflectors 32, 33 and transmitted or reflected by the beamsplitter 31 is brought to the viewing location 11 such that the viewing location 11 essentially is the same size and configuration as the lens 30. By placing the lens of the eye 12 at the viewing location 11, the light is focused on the retina of the eye forming an image seen by the viewer 13.

Advantageously, using the described conjugate optics path and system, relatively minimal amount of light from the image source 20 is lost, and, conversely, relatively maximum amount of light is directed to the eye 12. It is to be appreciated that there may be some loss of light due to absorption in the various components of the system, inefficiencies in those components, and transmission or reflection by the beamsplitter 31 of some of the light incident thereon back to the lens 30. It also will be appreciated that there is substantial accuracy of image and image resolution conveyed to the eye 12, for example, since the number of elements in the viewing system 10 is relatively minimal, image distortion is minimized. Furthermore, especially if a relatively good quality, high resolution retro-reflector is used so that the precise location at which the enlarged image 34 is in focus will not be critical, e.g., it can be behind or in front of the retro-reflector, there is a reduced tolerance required for the relative positioning of the components of the viewing system 10, thus making the viewing system relatively robust and reliable. However, as was indicated above, it may be desirable for best image quality and/or viewing to focus the image at the retro-reflectors.

The actual position of the viewing location 11 relative to the lens 30 and image source 20 ordinarily will depend on the focal length of the lens 30. Since the viewing location 11 can be located relatively remotely from the lens 30 and image source 20, for example, at a distance of 20 inches or more, which is quite typical when a computer screen is viewed, for example, the lens 30 may have a relatively long focal length with the advantages attendant such a lens. An example is a 50 mm focal length lens mentioned above; but the focal length may be greater or less than 50 mm. Long focal length gives very good/long eye relief. Long focal length also allows the head box to be larger than in conventional head (or helmet) mounted displays, for example. Further, a longer focal length lens compared to that used in head (helmet) mounted displays can provide a larger sweet spot for viewing the image, and such a lens can provide a relative narrow angle of view for privacy of viewing. The narrow angle of view can be limited easily to the area of the respective retro-reflectors, for example, to allow the entire image on the retro-reflector(s) to be viewed. The ability to view the entire image at the retro-reflector(s) also produces a relatively wide field of view to view all information on the retro-reflector(s), and this is further enhanced or all the more so by the effective placement of the viewer's eye at the lens 30 relative to the image source as is described else where herein.

Since the viewing location 11 is relatively precise and since the conjugate optics path in the viewing system 10 tends to avoid directing light outside the various optical paths shown in FIG. 1, for example, the image created by the image source 20 can be viewed by the viewer 13 with relative privacy and without disturbing others. Moreover, since the display 21 of the image source 20 may be rather small, the power required to operate that image source can be correspondingly small. In fact, the invention has been found useful to present an enlarged image 34 that has a diagonal dimension of approximately 9 inches using the above-mentioned 0.7 inch image source.; such image source has been operated successfully in a viewing system 10 to present the large image mentioned while requiting relatively low power, for example, on the order of less than about 3 watts.

The beamsplitter 31 may provide a balanced operation to have 50 percent of the light incident on the beamsplitter reflected and 50 percent transmitted. Thus, of the light incident on the beamsplitter 31 from the lens 30 and reflector 37, 50 percent is reflected via the beamsplitter and sent toward the retro-reflector 32 as light 41a; the other 50 percent is transmitted via the beamsplitter to the retro-reflector 33 as light 44b. Of the reflected light from the retro-reflector 32, 50 percent of the light will be transmitted through or via the beamsplitter 31 and will travel to the viewer's eye 12; and 50 percent will be reflected back to the reflector 37 and projector lens 30. Similarly, light reflected by the retro-reflector 33 will be reflected to the viewing location or transmitted to the reflector 37 and lens 30. This configuration of components in the viewing system 10 can transfer to the viewer's eye a maximum of about 50 percent of the light produced by the image source 20. However, if desired, the beamsplitter 31 can be modified in ways that are well known to change the ratio of the reflected light to the transmitted light thereby. Also, the beamsplitter 31 may include an anti-reflection coating so that all or an increased amount of the image comes from one side of the beamsplitter, thereby reducing the likelihood of a double image.

Figure 2:
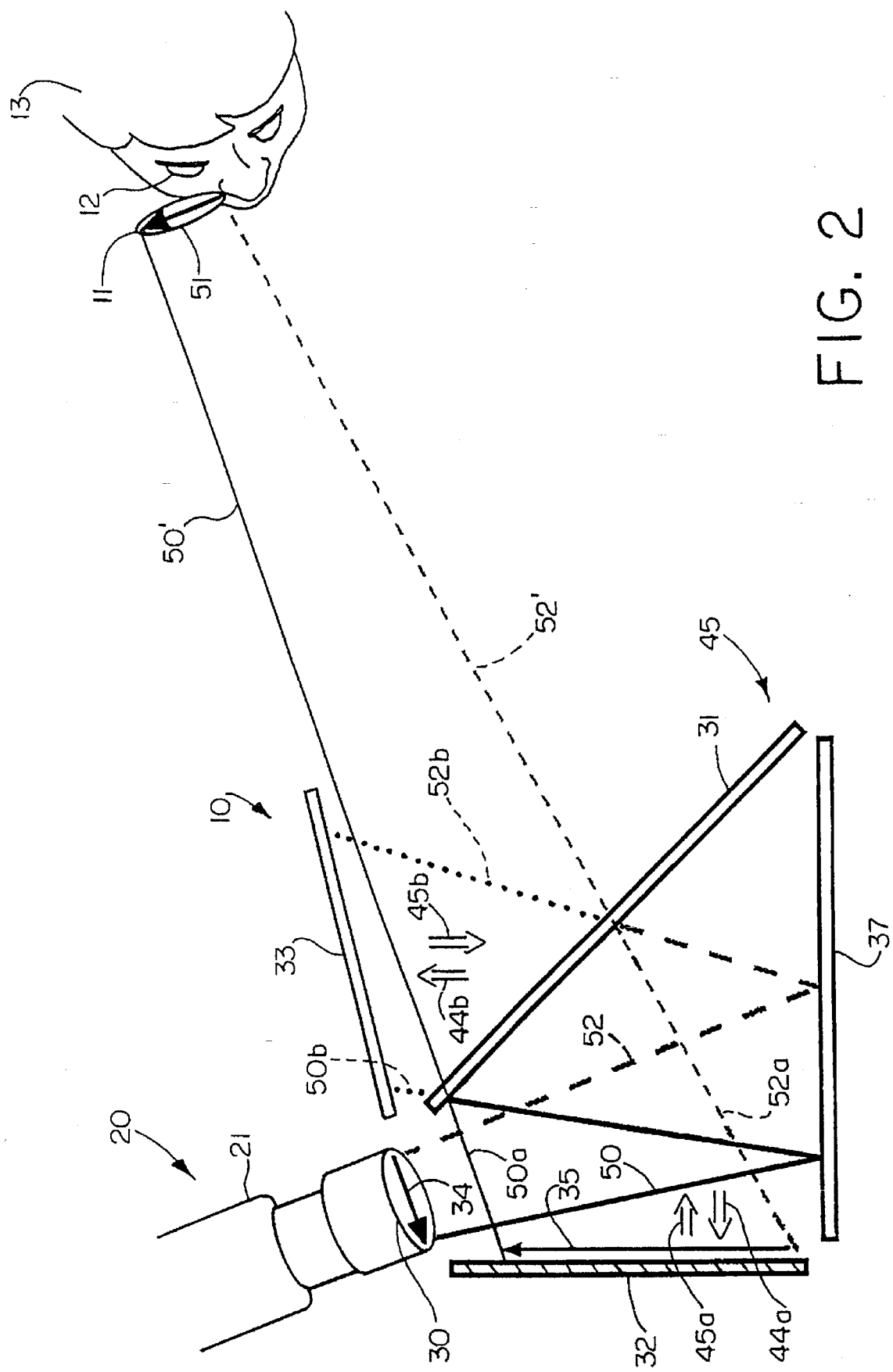
FIG. 2 is a schematic illustration similar to FIG. 1 but with a number of light rays shown.

Turning to FIG. 2, the viewing system 10 is shown with a number of light rays illustrated to facilitate explaining operation of the invention. The image 34 is projected by the image source 20 and lens 30 toward the retro-reflectors 32, 33 using a reflector 37 to fold the optical path and using the beamsplitter 31. As is seen, only a single reflector 37 is required to fold the optical path for both retro-reflectors. Only light rays which impinge on the retro-reflector 32 are shown in their entirety reaching the viewing location 11. The light rays impinging on the retro-reflector 33 are only partly shown in dotted lines to present an understanding of how the retro-reflector 33 functions in the viewing system 10. As is seen in FIG. 2, the retro-reflector 33 does not have to be precisely place relative to the retro-reflector 32, i.e., the angular relation need not be perpendicular or other specified amount. Rather, the placement of the retro-reflectors relative to each other and relative to the beamsplitter 31 must be such that the light rays travel to the respective retro-reflectors and are reflected thereby ultimately for reaching the viewing location 11 via the beamsplitter 31. It also will be understood that, although the invention preferably uses two (or more) retro-reflectors 32, 33 to avoid losing some of the light, such as the light directed to the retro-reflector 33, from the conjugate optics 36 of the viewing system 10. However, if desired it is possible to operate the viewing system 10 using only a single retro-reflector in which case the brightness of the image provided at the viewing location 11 may be somewhat reduced relative to a system in which two retro-reflectors are used in a manner shown in FIGS. 1 and 2, for example.

At the head of the arrow image 34 light ray 50 is shown emanating from the projector lens 30. Obviously, many more light rays also are emanating from that location and elsewhere of the lens 30, but one is sufficient to understand operation using conventional ray tracing techniques. Specifically, ray 50 is directed to the reflector 37 from which it is reflected by conventional reflection principles to the beamsplitter 31. What is meant by conventional reflection principles is the concept of specular reflection in which the angle of incidence equals the angle of reflection, this being considered relative to a normal or perpendicular line relative to the surface of the reflector 37, for example. In contrast, reflection using principles of retro-reflection and/or conjugate optics results in a light beam being reflected exactly back along the same path of incident light on a reflector, except that the reflected light is in a direction opposite the incident light.

When light ray 50 impinges on the beamsplitter 31, approximately 50 percent of that light is reflected using conventional reflection principle (angle of incidence equals the angle of reflection) from the beamsplitter 31 to the retro-reflector 32. The light then is retro-reflected by the retro-reflector back toward the beamsplitter 31 and is transmitted through or via the beamsplitter 31 to the viewing location 11 as light ray 50. The location between the beamsplitter 31 and retro-reflector 32 along light ray 50 is designated 50a, as this is the area of the conjugate optical path for the light ray 50 where it is incident on and reflected from the retro-reflector 32.

A portion of the light ray 50 which is directed by the reflector 37 to the beamsplitter 31 is transmitted through the beamsplitter 31, for example, 50 percent of that light. Such light is shown in dotted line between the beamsplitter 31 and retro-reflector 33 and is designated 50b. The light 50b also is in a conjugate optical path between the beamsplitter 31 and the retro-reflector 33, whereby such light incident on the retro-reflector 33 and reflected thereby are in the same path but opposite direction. Light 50b that is reflected by the retro-reflector 33 onto the beamsplitter 31 is divided by the beamsplitter 31, and a portion is reflected to the viewing location 11; and part of that light 50b is transmitted through the beamsplitter 31 for reflection by the reflector 37 back toward the lens 30 along the same path of light ray 50. Light rays 50a, 50b head toward the viewing location 11 along the same path 50' and direction as the light ray 50 heading toward the viewing location 11, and they are viewed as part of the head of the arrow image 51 seen at the viewing location 11.

Light ray 52 comes from the tail of the arrow image 34 at the lens 30 and is shown in dashed lines. The reflection of that light ray 52 in the viewing system 10 to provide conjugate light rays 52a and 52b and the combined light ray 52' to the image 51 is similar to that just described with respect to the light ray 50, 50a, 50b in order to form the tail of the arrow image seen at the viewing location 11.

Figure 3:
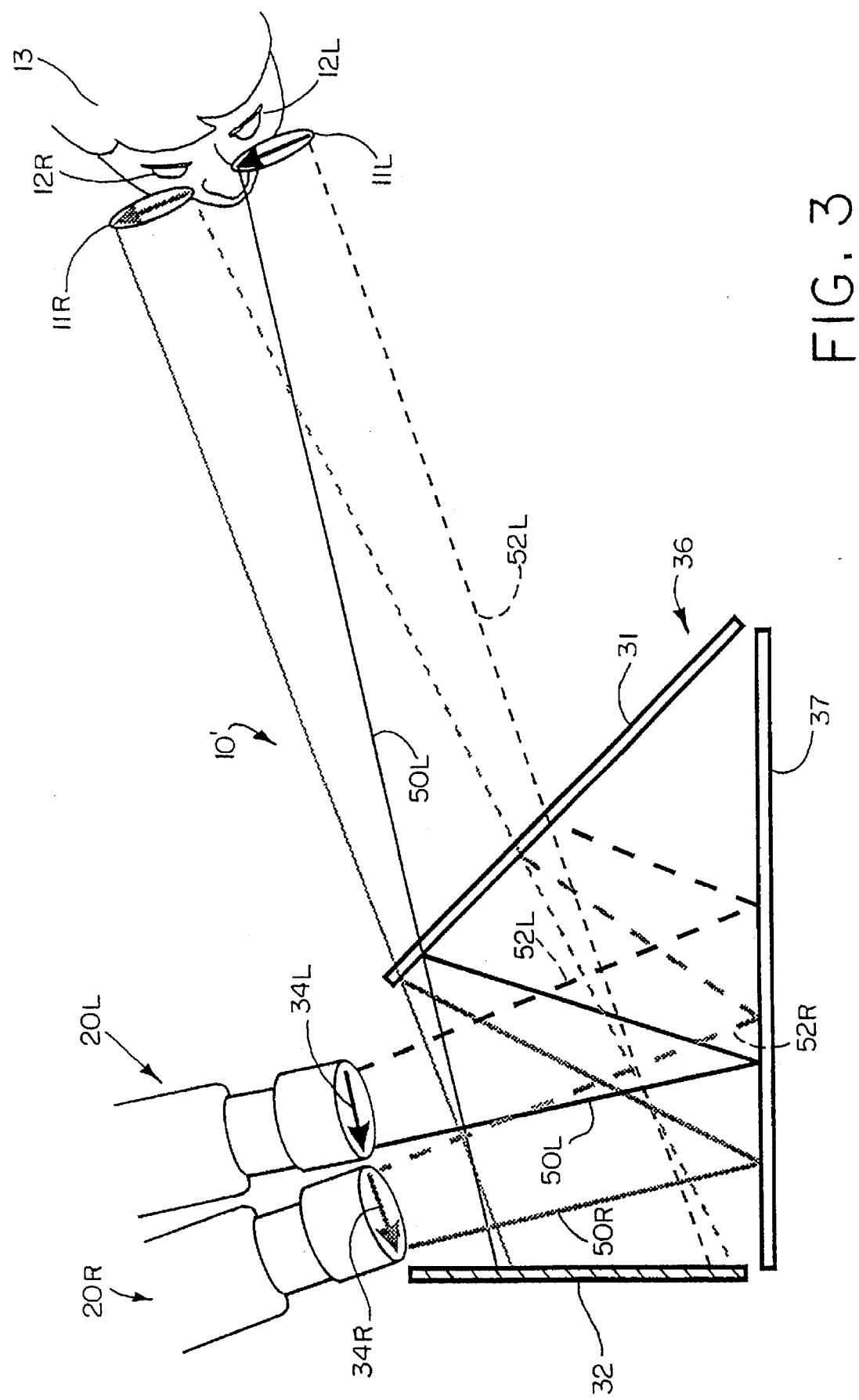
FIG. 3 is a schematic view of a modified version of viewing system in which plural projectors or image sources are used.

Referring to FIG. 3, two separate image sources 20L, 20R are shown in use with da viewing system 10' to provide, respectively, left eye and right eye images at viewing locations 11L, 11R associated with the respective eyes 12L, 12R of a viewer 13. Operation of the viewing system 10' in FIG. 3 with plural image sources 20L, 20R is essentially the same as operation of the viewing system 10 described above with respect to a single image source.

Due to the characteristics of retro-reflectors, the image 34L from the image source 20L is directed to the left eye without interfering with the right eye image. Similarly, the image 34R for the right eye is directed to the right eye with viewing location 11R without interfering with the image provided at the left eye image viewing location 11L. Using two image sources in the manner illustrated in FIG. 3, the viewing system 10' can provide images to both eyes of the viewer 13 simultaneously. The images may be identical ones in which case the viewer sees the images in two dimensions. However, if desired, the images may be slightly differently aligned in order to provide the type of left eye and right eye images used to obtain three dimensional stereoscopic viewing effects.

It will be appreciated that the various components of the viewing system 10' shown in FIG. 3 with the same reference numeral as those used in describing the viewing system in FIGS. 1 and 2 are the same or essentially the same as those components described above with reference to FIGS. 1 and 2. The same is true with respect to components that are shown with the suffix R or L; they are the same as those described above without the suffix, except now they are provided to obtain right eye and left eye images, respectively.

The basic private viewing system 10 shown in FIG. 1 uses the image source or monitor 20 and lens 30 as a projector. The lens 30 may be chosen such that the projected image is focused on the retro-reflector 32 (and 33). In order to position the image several feet from the retro-reflector at a viewing location 11, for example, it is necessary to place the projector at a similar distance. At the same time, though, it is desirable to minimize the physical size of the viewing system 10. These conflicting requirements can be accomplished simultaneously by using the mirror 37 to fold the path the light rays follow from the projector to the retro-reflector(s). The ray tracings in FIG. 2 from the projector to the viewer's eyes shows operation using such folded optical path.

It also is desirable to have a relatively large head box for the private viewing system 10. Since the diameter of the sweet spot at the viewing location 11 is directly related to the diameter of the lens 30 or output device of the projector supplying an input image and light to the viewing system 10, one way to increase the size of the sweet spot is to use a relatively large lens, for example, large in comparison to that required in a helmet or head mounted display system.

The embodiment of viewing system 10' shown in FIG. 3 using two projectors is another technique for increasing the diameter of the head box and sweet spot through which the viewer 13 can look at an image or at images. The larger the diameter of the head box, and also the larger the diameter of the sweet spot or sweet spots, the correspondingly larger the distance that the viewer 13 can move the position of the eyes and/or the head from side-to-side or up-and-down, for example.

Figure 4:
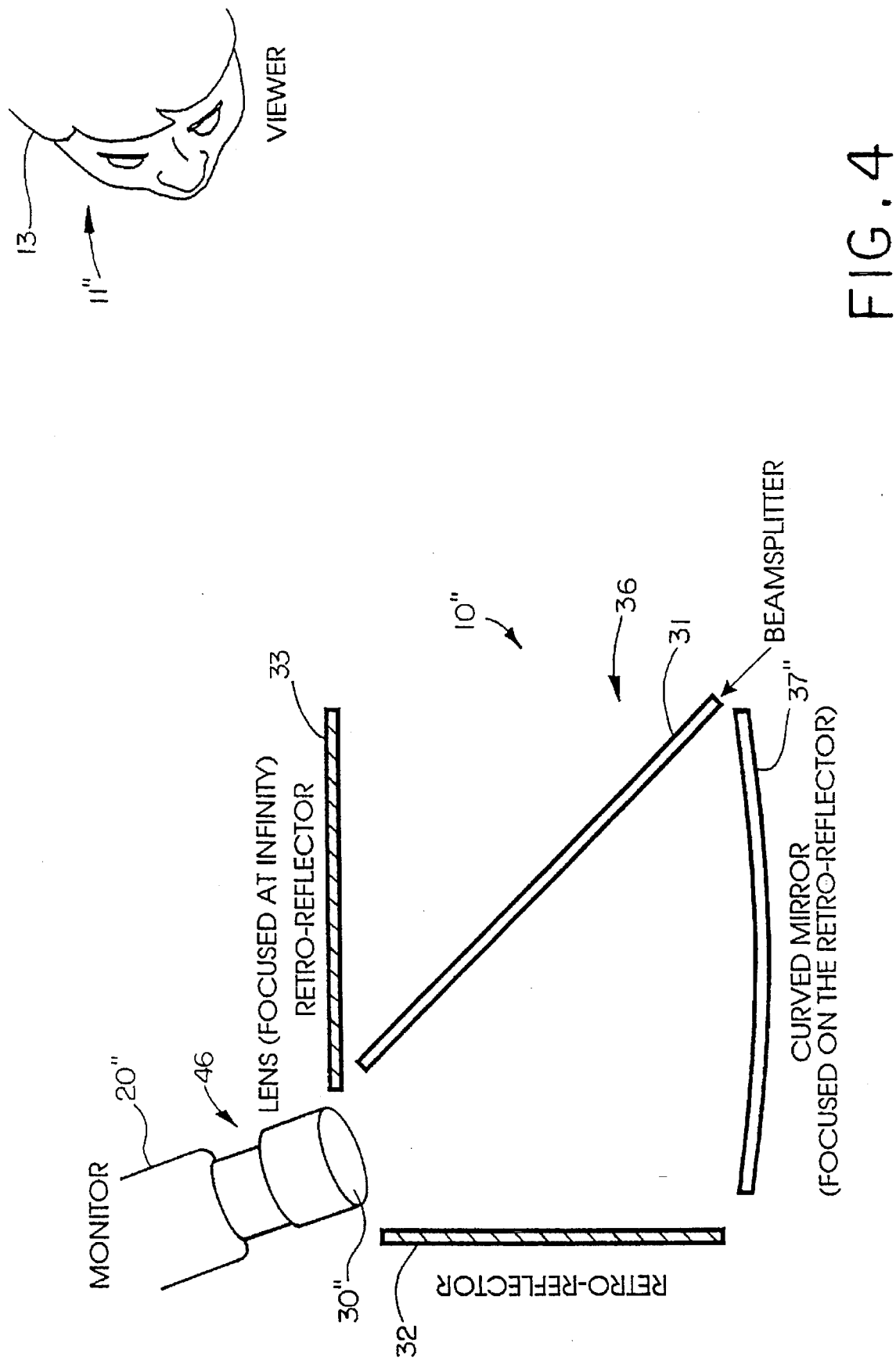
FIG. 4 is a schematic view of another modified version of viewing system in which a focusing reflector in the folded light path is used.

In FIG. 4 is illustrated another embodiment of viewing system 10" in which a different technique is used to increase the diameter of the head box thereof. In FIG. 4 a curved mirror 37" is used to fold the optical path of the viewing system 10" from the image source 20" to the retro-reflectors 32, 33. In the viewing system 10" of FIG. 4 the projector 46, which includes the image source 20" and the focusing optics or lens 30", such lens 30" is focused at infinity and is directed toward the mirror 37". Additionally, the light from the projector 46 is converged by the mirror 37" such that an image is focused on the retro-reflectors 32, 33 either by reflection from the beamsplitter 31 or transmission through the beamsplitter 31 in the manner described above. A light my tracing of the operation of the viewing system 10" is depicted in FIG. 5.

Figure 5:
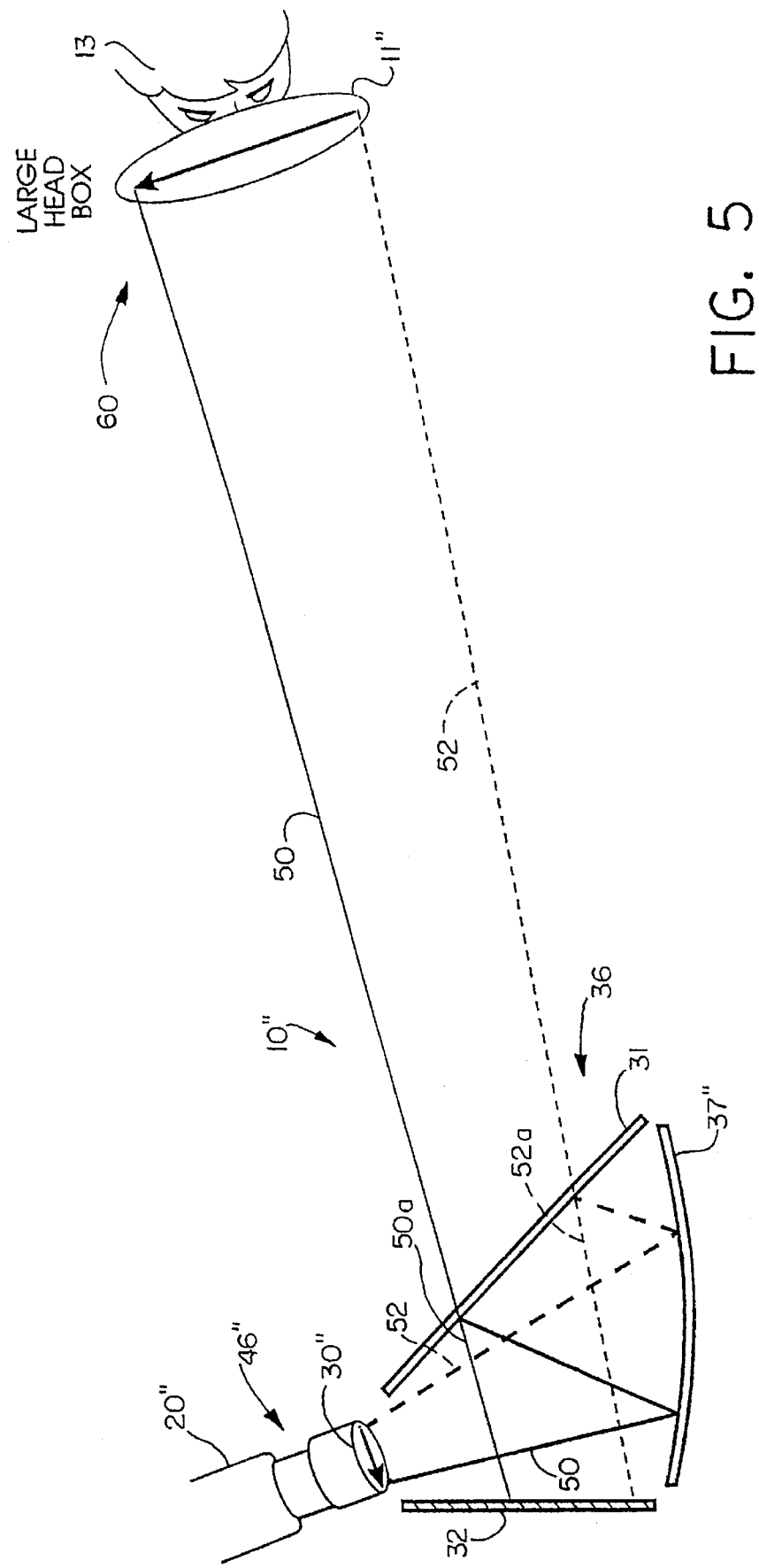
FIG. 5 is a schematic illustration similar to FIG. 4 but with a number of light rays shown.

In FIG. 5 light rays 50 and 52 are shown similarly to the illustration of FIGS. 2 and 3 described above. Referring to light ray 50, for example, it is projected by the projector 46 toward the reflector 37" from which it is specularly reflected to the beamsplitter 31. As was mentioned above, the lens 30" is focused at infinity, and the concave reflector or mirror 37" is curved so as to focus an image at the retro-reflector 32. Although retro-reflector 33 is not shown in FIG. 5 for simplicity of the illustration, the retro-reflector 33 preferably also would be located relative to the concave mirror 37" so as to have an image focused on it, too.

Ray 50 is specularly reflected by the beamsplitter 31 to the retro-reflector 32, and it also is reflected by the beamsplitter 32 back along the conjugate path 50a for transmission through the beamsplitter 31 to the viewing area 11". In FIG. 5 the reference numerals with a suffix "a" identifying light rays indicate those light rays travelling along conjugate optical path portions between the beamsplitter 31 and the retro-reflector 32.

It will be seen in FIG. 5 that at the viewing location 11" there is in effect a large head box 60 and sweet spot in which the image provided by the viewing system 10" can be seen by the viewer 13. As is seen in FIG. 5, a result of including a curved reflector 37" in a viewing system 10" is to enlarge the diameter of the head box and the sweet spot.

According to the invention it is possible to combine all of the techniques described above to obtain the widest possible head box. These techniques include using a relatively large lens 30, for example, using plural projectors or image sources 20, and/or using the focusing type of reflector 37" in folding the optical path, and preferably using that reflector in combination with the projector lens 30" that is focused at infinity. The results achieve a relatively wide head box. Other features of head mounted or helmet mounted optical display systems also may be used in connection with the present invention, such as those features disclosed in the aforementioned patent applications that are incorporated by reference.

Figure 6:
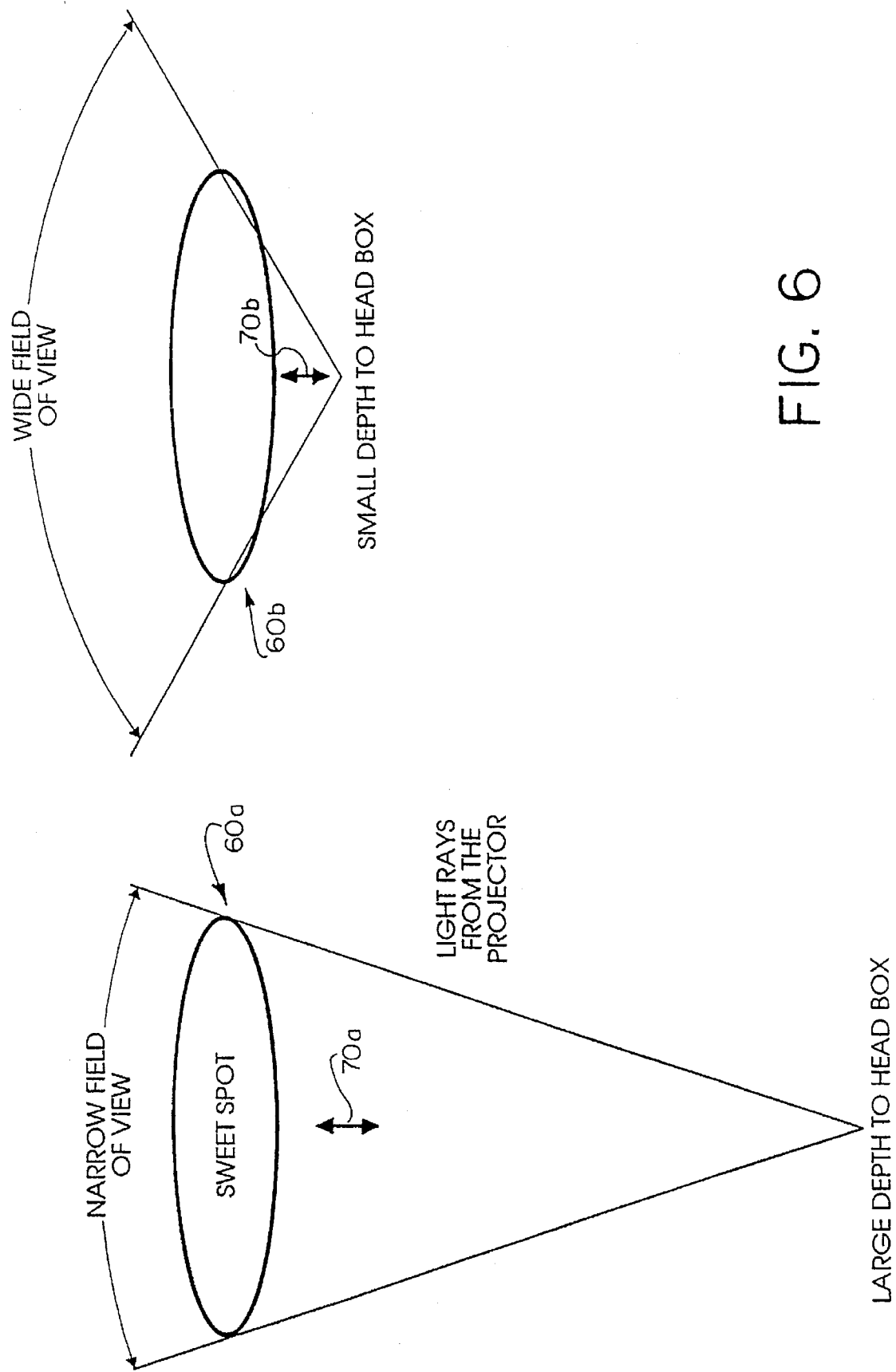
FIG. 6 is a schematic view of light box relationships compared between the viewing system of the present invention and a head mounted or helmet mounted viewing or display system.

Briefly referring to FIG. 6, the depth dimension characteristics 70a of the head box 60a in the present invention is shown in the left hand view in comparison to the depth 70b of a head box 60b of a head mounted or helmet mounted display. In the present invention there is a substantial depth, which provides, for example, improved eye relief and comfortable viewing characteristics relative, for example, to a head mounted display; and viewing privacy also is provided in the present invention without the need to mount the display and the viewer's head on or in a helmet. Thus, it will be appreciated from the foregoing description that the area to which light is directed by the viewing system 10, 10', 10", etc. described herein is a relatively private area. Light is not distributed or disbursed far to the sides of the viewing system; rather, it is directed to a location where an observer/viewer would be located to see the image.

Turning to FIGS. 7A through 7D, a mechanical arrangement of the parts of the viewing system 10, for example, is shown. In FIG. 7A the viewing system is depicted fully open and operational. Such viewing system occupies significant volume. When the viewing system is used in an aircraft, for example, it may be desirable to be able to stow the viewing system in a much smaller space than that occupied when the viewing system is used for viewing an image. The hinges and mechanical supports 40-44 shown in FIG. 1 may be used to provide such stowing capability. Specifically, as is seen in FIGS. 7B –7D it is possible to fold up the viewing system.

In FIG. 7B the image source 20 is folded to a relatively parallel relation with the retro-reflector 33. Also, the retro-reflector 32 is being folded toward the mirror 37. Folding continues in FIG. 7C as the retro-reflector 33/image source 20 combination are folded relative to the beamsplitter 31 and the retro-reflector 32 and mirror 37 combination also is folded relative to the beamsplitter 31. In FIG. 7D all of the components are folded to a fully closed relation for stowing (storing) the viewing system 10.

Figure 8:
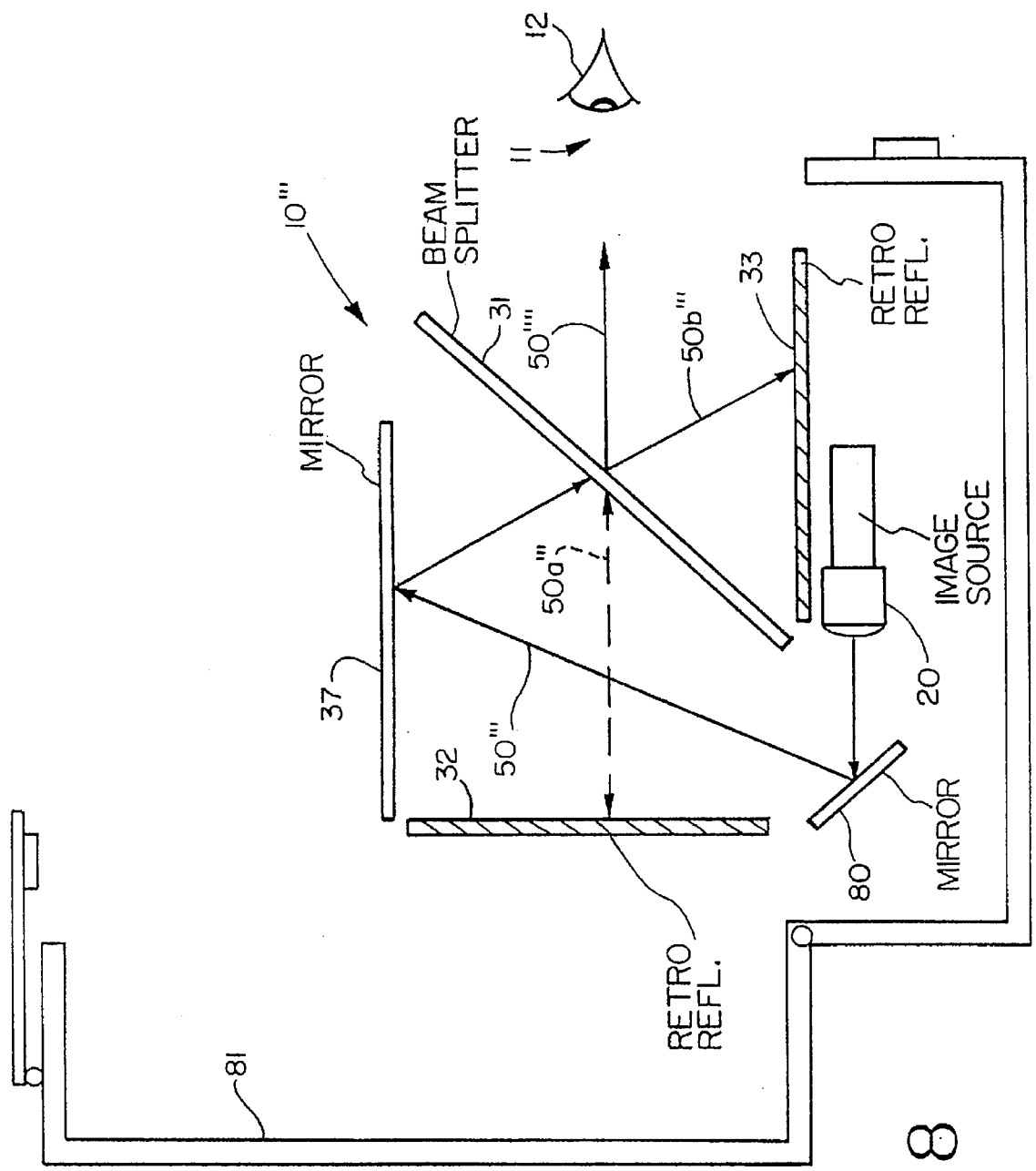
FIG. 8 is a schematic illustration of a modified viewing system according to the invention using a brief case or computer cast mounting arrangement.

Turning briefly to FIG. 8, a modified viewing system 10''' is shown. The viewing system 10''' is similar to the viewing systems 10, 10' and 10" described above. (In FIG. 8 triple primed numerals represent the same or similar components as those described above with no primes or less than three primes associated with the same reference numerals.) However, in the viewing system 10''' there is an additional mirror or specular reflector 80 shown for directing light from the image source 20 to the reflector 37 from a different direction than in the above-described embodiments. The viewing system 10''' is particularly suitable for mounting in a brief case display system, a computer, etc. because the image source 20 can be conveniently located in a relatively out of the way location. An exemplary brief case in which the viewing system 10''' is mounted is shown schematically at 81 in FIG. 8. The various components of the viewing system 10''' may be appropriately mounted in the brief case 81 and those components may be folded for stowing in a way similar to that depicted in FIGS. 7A–7D, for example. To that end, there may be various mounting devices, hinges, etc. used to mount the components of the viewing system 10''' to each other and/or to the brief case 81.

In the viewing system 10''' light 50''' having characteristics of an image is directed by the source 20 to reflector 80 and from there to the reflector 37. The reflector 37 reflects the light 50''' to the beamsplitter 31 which directs the light by reflection to the retro-reflector 32 or by transmission to the retro-reflector 33. The conjugate light rays or light paths 50a ''' and 50b ''' are shown. Output light 50"" is directed to the viewing location 11 for viewing by one or more eyes 12. (Only one representative light ray/path 50''', etc. is shown in FIG. 8, it being appreciated that there would be light rays/paths similar to those described above for the head and tail of the arrow image 34 or of some other image.

Figure 9:
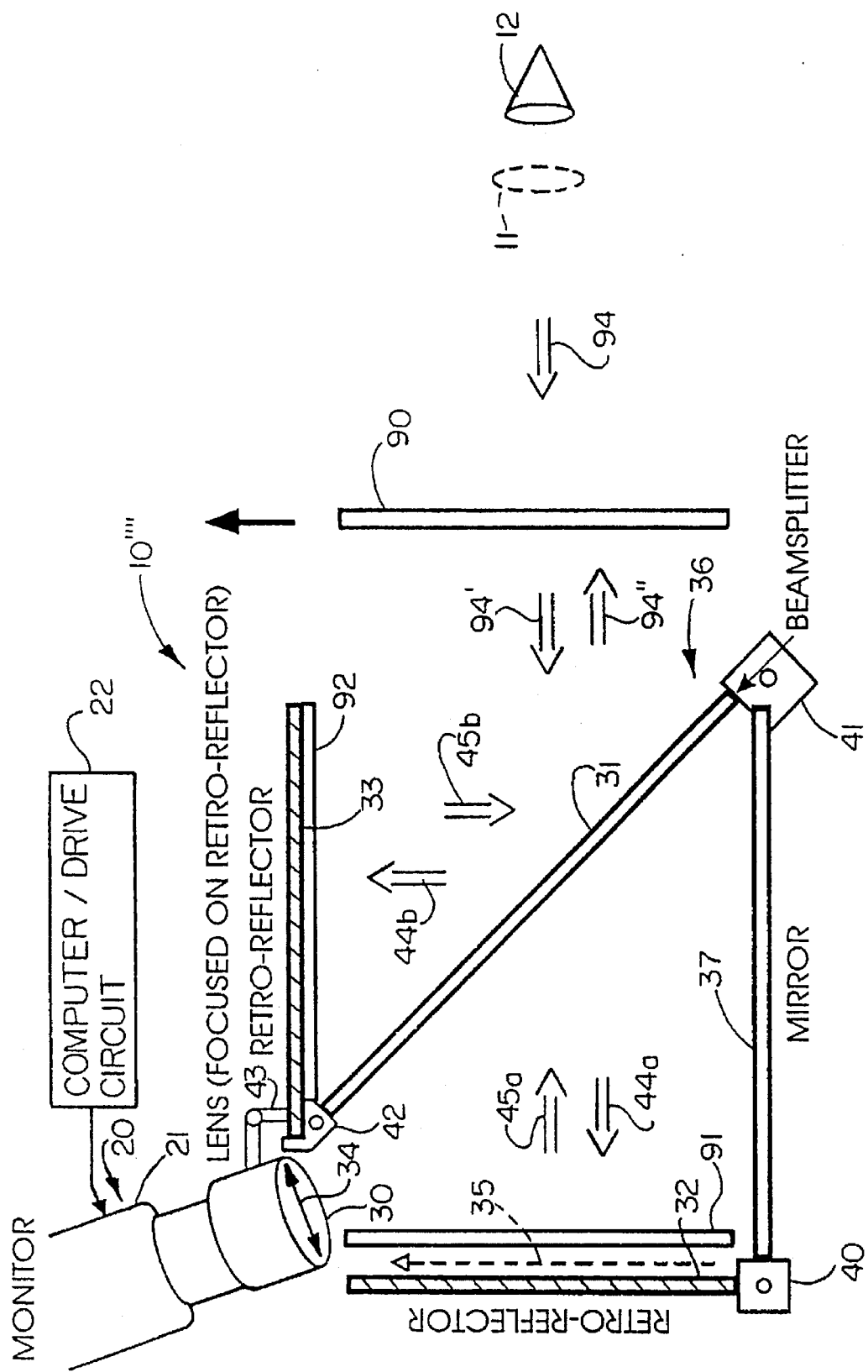
FIG. 9 is a schematic illustration of a viewing system according to the invention employing a glare reducing mechanism.

A modified viewing system 10"" is shown in FIG. 9. The viewing system 10"" is similar to those described above; however, in the viewing system 10"" provision is made to reduce glare. In the viewing system 10"" there is a linear polarizer 90, sometimes referred to as a plane polarizer; and an optical retarder, preferably a quarter wave plate, 91, 92, optically, i.e., in the optical path, between each retro-reflector 32, 33 and the plane polarizer 90. The image source 21 may be a liquid crystal display which provides output light that is plane polarized or, alternatively, the light output from the image source and/or the lens 30 may be plane polarized by using a separate polarizer (not shown).

The retro-reflectors 33, 34 should be chosen so as to preserve the direction of plane polarization of light incident thereon so that the light reflected thereby would have the same direction, axis or plane of polarization as the plane of polarization of light incident thereon. The reflector 37 should be selected as to avoid destroying the plane polarization of the light incident thereon and reflected thereby, although, modification of the plane of polarization may be acceptable.

Therefore, assuming the light, 44a and, 44b incident on the respective quarter wave plates 91, 92 is plane polarized, the quarter wave plates are so oriented relative to the respective planes of polarization of the light 44a, 44b as to convert the light transmitted therethrough from plane polarized light to circularly polarized light. Exemplary orientation would be such that the appropriate axis of the quarter wave is at 45° to the plane of polarization of the light incident thereon. The retro-reflectors 32, 33 are so designed that they reverse the direction of circular polarized light such that left hand circularly polarized light incident thereon will be changed to right hand circularly polarized light upon reflection thereby. Therefore, when the light reflected by the respective retro-reflectors 32, 33 is transmitted through the quarter wave plates 91, 92 as light 45a, 45b, the plane of polarization of light 45a, 45b is perpendicular (orthogonal) to the plane of polarization of the incident light 45a, 45b. Since light 44a, 44b began as the same light from the source 21, such light has the same plane of polarization; and light 45a, 45b will have the same plane of polarization.

The transmission axis or plane of polarization of the polarizer 90 may be oriented so as to be parallel to the plane of polarization of the light 45a, 45b. Therefore, light 45a, 45b transmits through the polarizer 90 preferably without any significant attenuation by the polarizer 90. Therefore, adding the polarizer 90 to the optical system 10"" does significantly reduce brightness of the output light viewed at the viewing location 11. Similarly, since the quarter wave plates 91, 92 are not primarily light absorbing but rather only provide optical retardation of light, brightness of the output light is not significantly affected by including the quarter wave plates in the viewing system 10"".

Consider light 94 emanating from outside the viewing system 10"" and directed to the viewing system so as ordinarily to cause glare. Light 94 is plane polarized by the polarizer 90. As the plane polarized light 94' is transmitted through the quarter wave plates 91, 92 it is circularly polarized; and upon reflection by the retro-reflectors 32, 33 such light is converted back to plane polarized light 94" having a direction or plane of polarization orthogonal to the plane of polarization of the light 94'. Therefore, polarizer 90 will block transmission of light 94" to the viewing location 11 and, thus, reduce glare.

It will be appreciated that other arrangements of optical components may be used in the viewing system 10"" to obtain glare reduction depending on the nature of the components. However, it will be appreciated that the features disclosed and described with respect to the viewing system 10"" of FIG. 9 may be used to reduce glare preferably without significantly reducing the brightness of the primary image displayed at the viewing location 11.

STATEMENT OF INDUSTRIAL APPLICATION

In view of the foregoing it will be appreciated that the invention may be used in viewing images from an image source.

I claim:

1. A viewing system, comprising a focusing means, and conjugate optics, including a retro-reflector and a beamsplitter, and folding means for folding the optical path from said focusing means in said conjugate optics, and said focusing means being operable to direct an image from a source for focusing in said conjugate optics, and said conjugate optics including an output for direct viewing of the image.

2. A viewing system, comprising projector means for projecting along an optical path image from an image source, beamsplitter means for reflecting at least some of the light incident thereon and for transmitting at least some light incident thereon, retro-reflector means for receiving at least some light from the beamsplitter means and for reflecting such light in a conjugate path back toward said beamsplitter means, a reflector for folding at least part of the optical path between said beamsplitter means and retro-reflector means, and said beamsplitter means and retro-reflector means being positioned relative to each other and cooperative to cause at least some of the light reflected via said retro-reflector mean to be provided by said beamsplitter means for direct viewing of an image at a viewing location.

3. A viewing system, comprising a retro-reflector, means for directing incident light having characteristics of an image toward said retro-reflector, means for permitting viewing of reflected light reflected by said retro-reflector, said means for permitting viewing comprising light splitter means for reflecting at least some of said incident light and for transmitting at least some of said reflected light, and means for folding at least part of the optical path between said retro-reflector and said light splitter means, and said retro-reflector, means for directing, means for permitting, and means for folding being cooperatively positioned and operative to present a directly viewable image at a viewing location remotely located therefrom.

4. The system of claim 3, said retro-reflector comprising plural retro-reflectors, at least one of which is positioned to receive light reflected by said light splitter and to reflect light for transmission through said light splitter for viewing and at least one other being positioned to receive light transmitted by said light splitter and to reflect light for reflection by said light splitter for viewing.

5. The system of claim 4, said means for folding comprising means for reflecting light to said light splitter for delivery to said at least one and said at least one other retro-reflector.

6. The system of claim 3, said means for folding comprising a focusing means for enlarging the size of the area at which an image is able to be viewed.

7. The system of claim 3, said means for directing comprising an image source.

8. The system of claim 3, said means for directing comprising a projector.

9. The system of claim 3, said means for directing comprising means for presenting respective left eye and right eye images for viewing.

10. The system of claim 9, said means for presenting comprising plural image sources.

11. The system of claim 9, further comprising display means for presenting such images to provide three dimensional stereoscopic viewing.

12. The system of claim 3, said means for directing comprising a lens, and the viewing location at which the image is viewed is of a size that is substantially the size of the lens.

13. The system of claim 12, said relationship being substantially the same size whereby the eye of a viewer placed at the viewing location functionally is as though it were at the location of the lens relative to the source of the image provided the lens for directing by the lens.

14. The system of claim 12, said relationship being substantially the same size whereby the eye of a viewer placed at the viewing location functionally is as though it were at the location of the lens relative to the source of the image provided the lens for directing by the lens; and wherein said folding means has a characteristic of focusing light to enlarge the effective size of the viewing location.

15. A method of displaying an image with relative privacy, comprising
projecting an image toward a retro-reflector to provide incident light on the retro-reflector to form an image relative to the retro-reflector,
reflecting light by the retro-reflector along a conjugate optical path, relative to the incident light on the retro-reflector, toward a viewing location for viewing,
said projecting including at least one of reflecting or transmitting light by a beamsplitter to provide incident light to the retro-reflector, and said reflecting light toward a viewing location including the other of transmitting or reflecting, by the beamsplitter, light which has been reflected by the retro-reflector, and
further comprising folding the optical path traveled by light projected toward the beamsplitter.

16. A method of displaying an image for relatively private viewing, comprising
projecting light from a source toward a retro-reflector via a beamsplitter,
folding the optical path between the image source and the beamsplitter to increase the optical path of light travelling from the source to the retro-reflector, and
reflecting the light which is incident light on the retro-reflector as reflected light from the retro-reflector via the beamsplitter to a viewing location for direct viewing.

17. The method of claim 16, said projecting light comprising projecting light toward two retro-reflectors respectively by transmission through the beamsplitter to one retro-reflector and by reflection by the beamsplitter to the other retro-reflector.

18. The method of claim 17, said folding the optical path comprising using a common reflector to direct projected light to the beamsplitter for directing by the beamsplitter to both retro-reflectors.

19. The method of claim 16, wherein the beamsplitter and retro-reflector cooperate to provide a conjugate optics path whereby at least part of the path of light projected toward the retro-reflector and at least part of the path of light reflected by the retro-reflector are conjugate.

20. The method of claim 16, said projecting comprising projecting light from two image sources.

21. The method of claim 16, said projecting comprising projecting light from two image sources to obtain respective left eye and right eye images from the respective sources.

22. The method of claim 16, said projecting comprising forming respective left eye and right eye images for viewing by a viewer.

23. The method of claim 16, said projecting comprises using a focusing means, and said reflecting by the retro-reflector comprises providing to a viewing location at which a projected image can be viewed an image that is approximately the size of the focusing means.

24. The method of claim 23, said reflecting by the retro-reflector comprises providing to a viewing location, at which a projected image is viewable, an image that has a cross-sectional area that is approximately the size of the cross-sectional area of the focusing means.

25. The method of claim 16, said projecting comprises using a projection lens, and said folding including enlarging the apparent cross-sectional area size of the projection lens as viewed at a viewing location thereby effectively enlarging the size of the area at the viewing location at which a projected image is viewable.

26. A foldable viewing system, comprising
a retro-reflector,
projector means for directing incident light having characteristics of an image toward said retro-reflector,
beamsplitter means for permitting viewing of reflected light reflected by said retro-reflector,
said beamsplitter means being positioned relative to said projector means and said retro-reflector for reflecting at least some of one of said incident light and reflected light and for transmitting the other of said incident and reflected light, and
reflector means for folding at least part of the optical path between said retro-reflector and said beamsplitter means, and
foldable support means for supporting said retro-reflector, beamsplitter means and reflector means relative to each other to provide an image for viewing at a viewing area in response to incident light being received from said projector means.

27. The system of claim 26, said foldable support also including means for supporting said projector means.

28. The system of claim 26, said foldable support being operative to fold said retro-reflector, beamsplitter means and reflector means in generally flat relatively overlying relation.

29. The system of claim 28, said retro-reflector comprising plural retro-reflectors, at least one of which is positioned to receive light reflected by said beamsplitter means and to reflect light for transmission through said beamsplitter means for viewing and at least one other being positioned to receive light transmitted by said beamsplitter means and to reflect light for reflection by said beamsplitter means for viewing, and said foldable support means being operative to fold said plural retro-reflectors, beamsplitter means and reflector means in generally flat relatively overlying relation.

30. A viewing system, comprising
a retro-reflector,
means for directing incident light having characteristics of an image toward said retro-reflector,
means for permitting viewing of reflected light reflected by said retro-reflector,
said means for permitting viewing comprising light splitter means for reflecting at least some of said reflected light and for transmitting at least some of said incident light, and means for folding at least part of the optical path between said retro-reflector and said light splitter means, and said retro-reflector, means for directing, means for permitting, and means for folding being cooperatively positioned and operative to present a directly viewable image at a viewing location remotely located therefrom.

31. The system of claim 30, said means for folding comprising a focusing means for enlarging the size of the area at which an image is able to be viewed.

32. The system of claim 30, said means for directing comprising means for presenting respective left eye and right eye images for viewing, and said means for presenting comprising plural image sources.

33. The system of claim 30 said means for directing comprising a lens, and the viewing location at which the image is viewed is of a size that is substantially the same size as the lens, whereby the eye of a viewer placed at the viewing location functionally is as though it were at the location of the lens relative to the source of the image provided the lens for directing by the lens.

34. The system of claim 30, said means for directing comprising a lens, and the viewing location at which the image is viewed is of a size that is substantially the same size as the lens, whereby the eye of a viewer placed at the viewing location functionally is as though it were at the location of the lens relative to the source of the image provided the lens for directing by the lens; and wherein said folding means has a characteristic of focusing light to enlarge the effective size of the viewing location.

* * * * *